Dec. 8, 1942.   W. A. FLUMERFELT   2,304,732
SEALING MEANS FOR JOINT STRUCTURES LINKING MOVABLE MEMBERS
Filed May 1, 1941   2 Sheets-Sheet 1
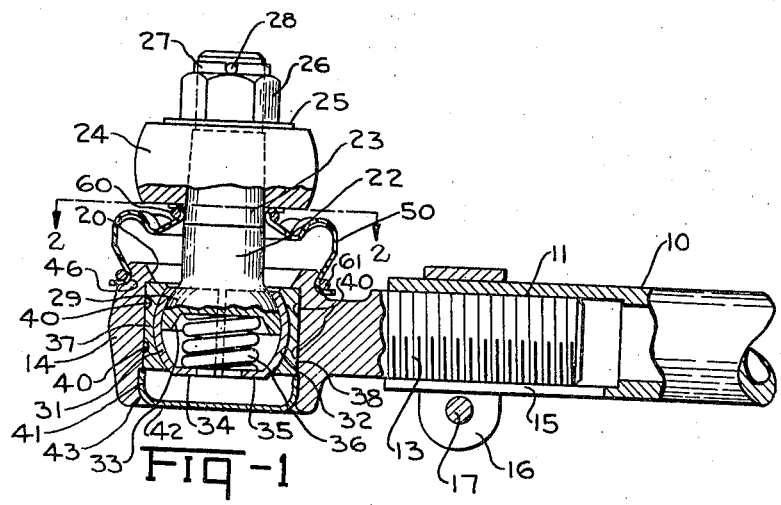
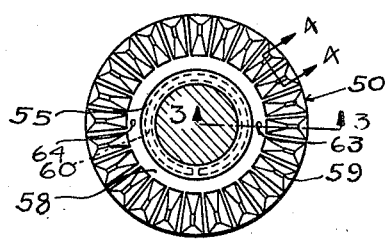
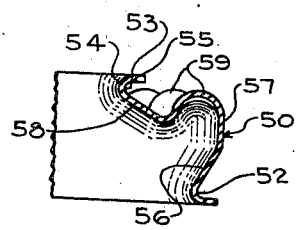
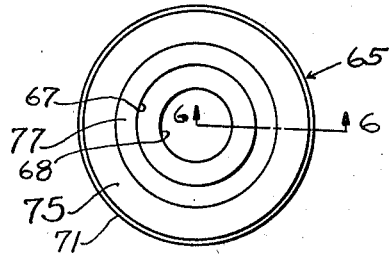
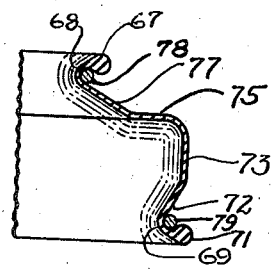
INVENTOR
William A Flumerfelt
BY Braselton Whitcomb Davies Dec. 8, 1942.   W. A. FLUMERFELT   2,304,732
SEALING MEANS FOR JOINT STRUCTURES LINKING MOVABLE MEMBERS
Filed May 1, 1941     2 Sheets-Sheet 2

INVENTOR
William A. Flumerfelt
BY
Braselton Whitcomb-Davies

Patented Dec. 8, 1942

2,304,732

UNITED STATES PATENT OFFICE 2,304,732

SEALING MEANS FOR JOINT STRUCTURES LINKING MOVABLE MEMBERS

William A. Flumerfelt, Columbus, Ohio, assignor to The Columbus Auto Parts Company, Columbus, Ohio, a corporation of Ohio Application May 1, 1941, Serial No. 391,368

4 Claims. (Cl. 287—90)

This invention relates to improved sealing means for joint structures and more particularly to a protective closure and sealing means for joints usable with or incorporated as parts of tie rod and drag link assemblies for automotive use.

The invention comprehends the provision of a sealing means in the form of an extremely flexible and resilient member which effectively embraces the relatively movable components of the joint construction.

An object of the invention is the provision of a sealing closure for joint constructions having portions contacting with or secured to relatively component elements of the joint in such a manner as to substantially eliminate slippage between the contacting portions of the closure and the joint elements.

Another object is the provision of a resilient closure fabricated of highly flexible material and of such configuration as to provide means which do not interfere or restrict the oscillatory and rotary movement of the component elements of the joint structure avoiding thereby relative movement between the closure engaging means and the movable elements of the joint structure.

Another object is the provision of a sealing closure for a ball joint wherein the closure is made of material which is resistant to the deterioration effects of gasoline, water, oils, and the like, and which is capable of being repeatedly flexed without destroying the seal.

A further object of the invention is the provision of an improved resilient closure means for a joint structure which is arranged to prevent ingress of water and foreign substance into the joint and yet one which is suitably vented so as to facilitate the introduction of lubricant into the joint construction without disrupting or distorting the sealing means.

Still another object is the provision of a sealing means for joint constructions fabricated preferably of a synthetic rubber like material or of a moldable material to a configuration of such a nature as to provide an excess of material which flexes or changes its contour during rotary and oscillatory movements of one of the joint elements.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a vertical sectional view illustrating a ball joint construction embodying a form of sealing means of my invention.

Figure 2 is a horizontal sectional view taken on the line 2—2 of Figure 1;

Figure 3 is an enlarged detail sectional view taken substantially on the line 3—3 of Figure 2;

Figure 4 is an enlarged detail sectional view taken substantially on line 4—4 of Figure 2;

Figure 5 is a top plan view showing a modified form of closure;

Figure 6 is an enlarged sectional view taken substantially on the line 6—6 of Figure 5;

Figure 7:
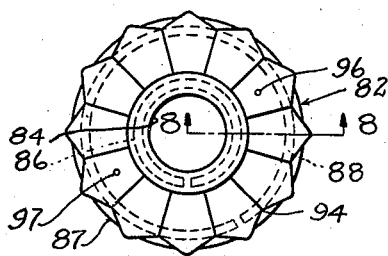
Figure 7 is a top plan view illustrating another form of the invention.

While I have illustrated the arrangement of my invention as particularly adapted as a closure for a tie rod joint or connection, it is to be understood that I contemplate the adaptation of my invention wherever the same may be found to have utility.

Referring to the drawings in detail, I have illustrated a form of tie rod construction for the dirigible or steerable wheels of a vehicle with which my invention has particular utility, 10 designating a tie rod preferably of tubular formation and which is interiorly threaded at one end as at 11 to receive a threaded tenon 13 of a joint housing 14, the tenon being formed as an integral part of the housing. The wall of the tie rod tube 10 adjacent the end is slotted longitudinally as at 15 and surrounding the tube is a clamp 16 adapted to be drawn into close engagement with the tie rod tube 10 by means of a bolt 17 and nut (not shown). By this means the tenon 13 and tube 10 are held in fixed relationship.

The housing 14 is of hollow configuration and, as illustrated, is of cylindrical formation terminating at its upper extremity in an inwardly projecting circular shoulder or flange 20. Extending into the housing is a stud member 22 having a tapered shank portion 23 arranged to accommodate an arm or member 24 which is connected to the spindle or means supporting a dirigible or steering wheel of the vehicle, the arm 24 being held in place by means of washer 25 and nut 26 threaded upon tenon 27 formed on the end of the stud member 22. A cotter pin 28 serves to prevent displacement of the nut 26.

The lower end of the stud member 22 is formed with a segmental spherically shaped portion 29 which extends into the hollow interior of housing 14. Surrounding the segmental spherical portion 29 and within the housing is a pair of complementary cup-like members 31 and 32 having spherically shaped outer lateral surfaces which form together a substantially ball-shaped configuration, the inner surfaces being also spherically shaped and arranged to coincide and contact with the spherically shaped portion 29 of the stud member, the latter serving to properly space and position members 31 and 32 to form the ball configuration. The lower extremity of the stud member 22 is provided with a recess 33 and the lower portions of members 31 and 32 are provided with lateral uniplanar portions 34 and 35. Fitting in the recess 33 and interposed between the stud member 22 and the flattened or uniplanar surfaces 34 and 35 is an expansible coil spring 36. Surrounding the cup-like members 31 and 32 are complementary bearing seats 37 and 38 which are formed with spherical inner surfaces arranged to fit and coincide with the exterior spherical surfaces of members 31 and 32, the exterior surfaces of members 37 and 38 being cylindrical to fit within the cylindrical inner walls of the housing 14. The members 37 and 38 are preferably provided with grooves 40 affording lubricant spaces or channels for lubrication of the bearing seat members and the walls of the housing.

The interior of the housing 14 at its lower end is provided with a cylindrical recess 41 of larger diameter than the cylindrical portion which accommodates the bearing seats 37 and 38 and snugly fitting into this recess is an inverted cup-like closing member 43, the latter being held in place by swaging portion 43 of the housing into engagement with the exterior surface of the cup, the latter also providing means for holding the bearing seats 37 and 38 in proper position in the housing.

The sealing means of the invention are adapted to enclose the joint structure by means of an inherently resilient or rubber like hollow closure member or boot which is arranged to engage the stud member and the housing in a manner to permit their relative movement and yet remain in effective and fixed engagement with both the stud member and housing at all times providing a constant seal against the ingress of foreign matter and the egress of the joint lubricating fluid. To this end, in the form shown in Figures 1 to 3 inclusive, the joint structure is enclosed by the hollow closure or boot member 50 which is made of suitable stretchable material and the walls are of uniform thickness having an annular curved recess 52 at its lower portion for engagement in a peripheral groove 46 provided on the upper exterior portion of the housing 14. The boot may be made of rubber, synthetic rubber or equivalent material having desirable elastic properties. The closure 50 is formed at its upper end with a curved annular recess 53 provided with a flange 55 forming a curved portion 54 arranged to contact as shown in Figure 1 with the tapered portion 23 of the stud member 22 and the upper surface of the flange 55 engaging the lower surface of the arm 24. The recesses 52 and 53 form the closing or sealing means of the boot structure or closure 50. The wall of the closure member immediately above the lower recess 52 is formed as an outwardly flaring portion 56 joining with a vertical cylindrical wall portion 57, while the upper recess 53 joins with an outwardly and downwardly flaring section portion 58 as particularly shown in Figure 3. The upper portion of the cylindrical wall 57 and the flaring section 58 are joined together by means of a series of moulded pleats or horizontally disposed folds 59 which provide means to take up any torsional and oscillatory movement of the closure during operative movement of the joint structure. It should be noted that the intermediate pleated or corrugated section of the hollow closure 50 is formed to a larger diameter than that of either of the end closures and that I provide very small openings 63 and 64 adjacent to said section to vent the structure permitting the egress of air that may be trapped within the closure or boot 50. In the form of the invention shown in Figures 1 to 3, the closure 50 is preferably made of a rubber like substance of the synthetic type being more resistant to the action of various solvents, chemicals and lubricants, and the same is held by its upper recess 53 to the stud member 22 by means of a contractile snap ring 60 and the lower portion is held in close engagement with the housing 14 by means of a snap ring 61 which embraces the recess 52. These rings have inherent resilient characteristics suitably functioning to at all times hold the closure in contact with the stud member and the housing respectively.

In the operation of the joint structure during normal operation of steering the vehicle the stud member 22 may rotate relative to the housing 14 and due to the normal function of the spring supporting the vehicle, the stud member may tilt with respect to the housing 14. During these movements of the stud member, there is sufficient flexibility, partly because of the folds or pleats 59 and the portion 58 to permit the relative rotation of the stud member 22 through approximately an included angle of 72°, that is, 36° each side of the "straight ahead" position of the vehicle to permit the closure member to be distorted or stretched without causing relative movement of the portions of the closure member beneath the snap rings 60 and 61, so that there is no relative movement between the stud 22 and the closure 50 and between the housing 14 and closure 50.

In the embodiment of the invention shown in Figures 5 and 6, the sealing means for the joint structure is in the form of a tubular shaped closure or boot 65 of an extremely flexible and resilient material resistant to deleterious action of various lubricating oils or greases and which is not deteriorated by gasoline, as for example a synthetic rubber known as Chloroprene rubber or Chemigum. In the embodiment illustrated, the wall of the tubular closure 65 is of uniform thickness and its upper end terminates into a bead 67 formed adjacent a curved annular section 68 arranged to tightly contact with the shank of the stud member. The lowermost portion of the tubular closure 65 is provided with an annular recess 69 of larger diameter than the recess 68 adapted to snugly engage the groove formed on the housing and the recess terminates into an enlarged bead 71. The closure member immediately above the recessed portion 69 is formed as an outwardly flaring wall 72 joining with a vertically disposed cylindrical portion 73, the latter is connected with a curved section provided with an inwardly extending flat surface 75 substantially horizontal with respect to the longitudinal axis of the closure. The upper recess 68 is joined to the uniplanar section 75 by means of an outwardly and downwardly flaring wall section 77 as particularly shown in the sectional view of Figure 6. It should be noted that the intermediate section of the closure member 65 is of a larger diameter than either of the end curved sections 68 and 69 in order to facilitate torsional and oscillatory movement of the closure during the operation of the joint structure. The form of closure shown in Figures 5 and 6 is adapted to be held to the stud member by means of a contractible snap ring 78 which urges the curved section 68 in fixed engagement with the shank of the stud member while the lower portion is held in close engagement with the housing by means of a snap ring 79 located in the annular section 69. The contractible snap rings 78 and 79 constituting the metallic means which hold the closure means into sealing engagement with the stud member and housing preventing slippage of these elements with respect to the tubular closure. In this form of the invention movements of the stud member with respect to the housing are not interfered with or restricted by the closure member due to the extreme flexibility of the wall portions forming the same which are distorted or stretched. The distorsion and stretching action of the intermediate enlarged portion of the closure prevents any slippage between the portions of the enclosure in engagement with the movable elements of the joint so that a lubricant-tight seal is at all times maintained between the closure member and the movable elements of the joint structure.

Figure 8:
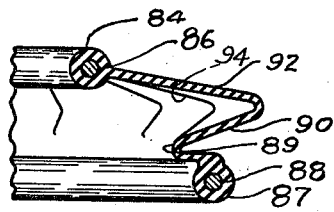
Figure 8 is an enlarged vertical sectional view taken substantially on the line 8—8 of Figure 7.

In the embodiment of the invention shown in Figures 7 and 8, the sealing means for the joint structure is in the form of a hollow closure or boot 82 molded of an extremely flexible and resilient rubber like substance of a synthetic rubber type. The wall of the closure 82 is of uniform thickness and its upper end terminates into a hollow ring or bead 84 adapted to receive a contractile snap member 86 which urges the bead into tight engagement with the shank of the stud member. The lowermost portion of the hollow closure or boot 82 is also provided with a hollow ring or bead 87 which covers a contractile snap member 88 adapted to urge the bead 87 into tight engagement with a groove formed on the housing. The closure member immediately above the bead 87 is formed with a recess 89 joining with an outwardly flaring portion 90. The upper bead 84 is joined to the flaring section 90 by means of an outwardly and downwardly flaring wall section 92 as particularly shown in the sectional view of Figure 8. The flaring sections 90 and 92 are of corrugated formation providing radial spaced pleats 94 as shown in Figure 7. By forming the intermediate section of the closure member 82 to a larger diameter than either of the end sections and providing the same with spaced corrugations, the rotary and oscillatory movements of the movable elements of the joint construction sealed by the closure 82 are not interfered with and such movements do not subject the closure 82 to appreciable tensional stresses. In addition small bleeder openings 96 and 97 are provided on the corrugated section to permit the egress of air that may be trapped within the closure or boot 82. The contractible snap members 86 and 88 constitute in association with the hollow end rings 84 and 87 the closure sealing means in engagement with the stud member and housing preventing slippage of these elements with respect to the tubular closure 82.

Figure 9:
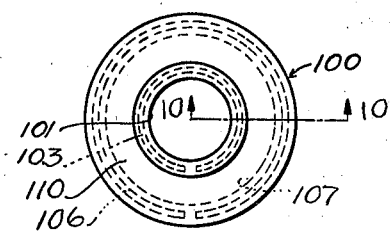
Figure 9 is a top plan view illustrating another form of the invention.
Figure 10:
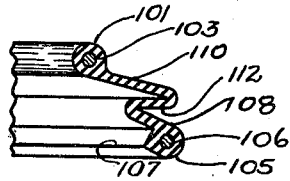
Figure 10 is an enlarged vertical sectional view taken substantially on the line 10—10 of Figure 9.

In the form of the invention shown in Figures 9 and 10 the sealing means for a joint structure linking members having rotary and oscillatory members such as a tie rod joint comprises a tubular member or boot 100 having thin walls of stretchable material of a synthetic rubber type substance of a substantially uniform thickness. The upper end of the boot 100 terminates into a hollow cylindrical member 101 which retains a contractile snap element 103 which causes the tight engagement of the cylindrical member 101 with the shank of the stud member or with the portion of the articulated member it encircles. The lower end of the boot 100 is provided with a cylindrical hollow member 105 adapted to enclose a contractile snap ring 106 which retains the member 105 into gripping engagement with the housing walls, or with the surface of the member it encircles. I also contemplate that the inner surface of the member 105 be molded as of a V-shaped contour 107 to conform to the shape of a groove provided in the member it encircles in order to enhance its gripping action. The wall of the tubular member 100 connecting with the member 105 is inwardly tapered as at 108 while the wall section connected to the cylindrical member 101 flares outwardly and downwardly as at 110. The inclined wall sections 108 and 110 are joined by a substantially horizontal portion 112. By molding the intermediate section of the boot 100 to a larger diameter than either of the cylindrical hollow sealing members 101 and 105 any appreciable stresses to these members is avoided because the distortion and stretching action of the intermediate enlarged portion prevents any slippage of the sealing members with the movable joint structure engaged thereby.

Figure 11:
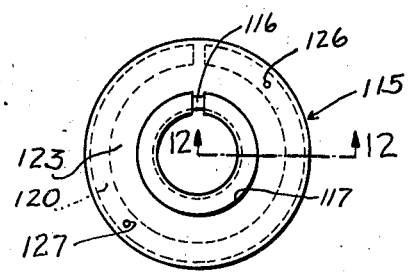
Figure 11 is a top plan view showing still a further form of the invention.
Figure 12:
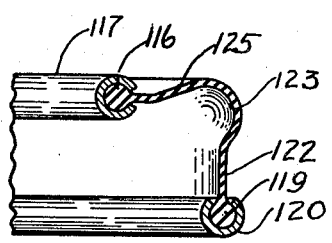
Figure 12 is a vertical sectional view taken substantially on the line 12—12 of Figure 11.

Referring to Figures 11 and 12, I have shown a modification of the sealing means of my invention adapted to be used in connection with the tie rod joint construction illustrated in Figure 1. In this modification the tubular closure element 115 is provided at its upper end with a ring 116 generally circular in cross section embraced by a contractible metallic channel shaped member 117, the latter adapted to tightly engage the shank of the stud member. The lower end of the tubular closure 115 terminates into a ring 119 of a substantially circular cross section which is also embraced by a contractible channel shaped member 120 which constrictingly engages the groove formed in the tie rod housing. In this form of the invention the main body portion of the closure member 115 is formed of resilient material preferably synthetic rubber of substantially uniformed thickness and comprises a cylindrical vertical wall section 122 extending from member 119 and joined to a curved section 123, the latter being connected to the upper ring 123 by a slightly inwardly inclined wall section 125. It should be noted that the intermediate curved section 123 has a slightly larger diameter than that of the ring member 119 and that a pair of air bleeder openings 126 and 127 are provided to permit the escape of air so that relatively large universal movement may be effected between the stud and housing of the joint structure without altering the effectiveness of the seal provided by the closure end portions in engagement with the contractible metallic members. It is to be understood that the air bleeder openings formed in the boot structures are very minute in character and under the normal inherent resiliency of the material from which the boot structures are made, the bleeder openings are normally closed and prevent the ingress of water or other foreign matter into the joint structures. If there is any pressure built up inside of the boot due to oscillation of the joint elements, the bleeder openings are so arranged as to permit the ingress or egress of air to equalize the pressure.

It is apparent that, within the scope of the invention, modifications and different arrangements may be made other than is herein disclosed, and the present disclosure is illustrative merely, the invention comprehending all variations thereof.

What I claim is:

1. A hollow closure member for a joint structure having relatively thin walls of stretchable material of substantially uniform thickness; sections adjacent to each end of said hollow closure wall adapted to tightly engage relatively movable elements of the joint structure; outwardly flaring frusto-conical portions merging into each of said end sections, one of said frusto-conical sections terminating a greater distance from the longitudinal axis of the closure member than the other, a curved annular section integrally joining the frusto-conical sections, said curved annular section being formed with corrugations radially arranged with respect to the longitudinal axis of the closure member, said end sections terminating in laterally extending flange portions, and metallic means engageable with the end sections adjacent said flange portions for retaining said end sections in engagement with relatively movable elements of the joint structure preventing relative movement between the elements and the closure engaging sections.

2. A hollow closure member for a joint structure having relatively thin walls of elastic material of substantially uniform thickness; sections adjacent to each end of said hollow closure wall adapted to tightly engage relatively movable elements of the joint structure; frusto-conical portions merging into each of said end sections, one of said frusto-conical sections terminating a greater radial distance from the longitudinal axis of the closure member than the other, a curved annular section integrally joining the frusto-conical sections, said curved annular section being formed with corrugations radially arranged with respect to the longitudinal axis of the closure member, and metallic means for retaining the end sections in engagement with relatively movable elements of the joint structure preventing relative movement between the elements and the closure engaging sections.

3. A hollow closure member for a joint structure having relatively thin walls of rubber-like material of substantially uniform thickness; said member being formed with axially aligned openings of different diameters, an outwardly and laterally extending flange portion formed on said member adjacent each opening; outwardly flaring sections integrally connected to said flange portions, and an intermediate annularly shaped curved portion integrally joining the outermost extremities of the outwardly flaring sections, the curved portion being formed with corrugations radially arranged with respect to the longitudinal axis of the openings in the closure member.

4. A hollow closure member for a joint structure having relatively thin walls of rubber-like material of substantially uniform thickness; said member being formed with axially aligned openings of different diameters, an outwardly and laterally extending circular flange formed on said member adjacent each opening; frusto-conical sections integrally connected to said circular flanges, and an intermediate annularly shaped curved portion integrally joining the outermost extremities of the frusto-conical sections; the curved portion being formed with corrugations radially arranged with respect to the longitudinal axis of the openings in the closure member, and an air bleeder opening in a wall of the closure member.

WILLIAM A. FLUMERFELT.